PAINE & CAVINESS.
Broom Head.
No. 56,461. Patented July 17, 1866.
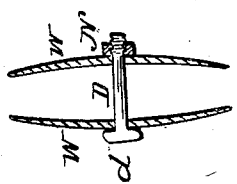
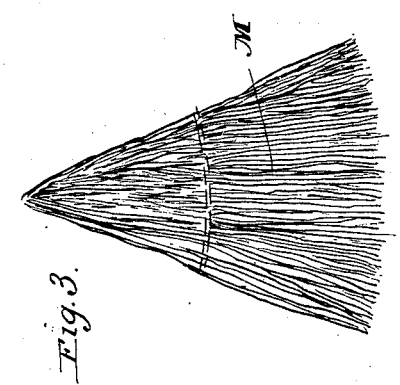
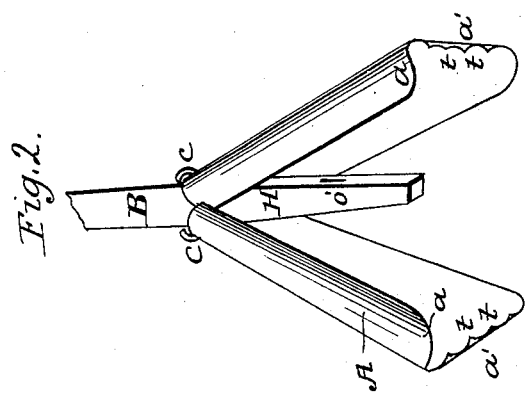
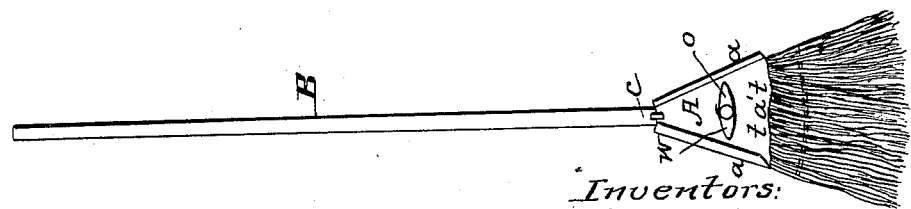
Witnesses:
Inventors:

UNITED STATES PATENT OFFICE.

W. PAINE AND R. E. CAVINESS, OF FAIRFIELD, IOWA.

IMPROVED BROOM-HEAD.

Specification forming part of Letters Patent No. 56,461, dated July 17, 1866.

*To all whom it may concern:*

Be it known that we, WILLIAM PAINE and RICHARD E. CAVINESS, of Fairfield, in the county of Jefferson, State of Iowa, have invented a new and useful Improved Broom-Head; and we do hereby declare that the following is a full and exact description thereof, reference being had to the accompanying drawings, making part of this specification, in which—

Figure 1 is the side view of the broom; Fig. 2, the jaws of the broom-head; Fig. 3, the arrangement of the broom-corn to be put in, and Fig. 4 the ribs and the bolt.

The object of our invention is to produce a cheap and at the same time substantial broom-head, simple in its construction and easy in the operation of replacing the worn-out broom-corn with a new one.

To enable others skilled in the art to make and use our invention, we will describe its construction and operation.

Two plates or jaws, A A, of sheet or malleable iron, are attached to the handle B of the broom by a piece of strong wire or pin, C, with its ends bent upward, permitting the jaws to readily open to receive corn or to close on it. The sides $a\ a$ of the jaws are bent in such a way as to lap over each other when the jaws are put together, while their lower sides, $a'\ a'$, or edges have several triangular teeth, $t\ t$, bent inside to seize upon the broom-corn and hold it fast in the head.

The handle H of the broom is flattened at its lower end, and has an opening, $o'$, corresponding to the similar openings $o\ o$ made in the jaws, through which a bolt, D, having a screw-thread cut at its end, is driven. Two oblong ribs or washers, $w\ w$, of sheet or malleable iron, also are put under the head $d$ of the bolt and under the nut N, serving as a clasp to keep tight the jaws A A around the broom-corn.

The operation to make the broom consists in the following: After the broom-corn is prepared in the shape M, it is put between the jaws A A, which are pressed together so as to bring their sides to overlap each other and their teeth $t\ t$ to enter into the broom-corn. Then the bolt D is driven through the openings of the ribs, jaws, handle, and through the broom-corn, and the nut N is screwed on as much as is necessary to make jaws to hold tight the broom-corn.

What we claim as our invention, and desire to secure by Letters Patent, is—

The plates A, having the flanges $a$, and the teeth $t$, hinged to the handle by means of the staples $c$, in combination with the clamps $w$ and bolt D, all arranged as shown and described.

WILLIAM PAINE.
RICHARD E. CAVINESS.

Witnesses:
RICHARD B. MURPHY,
ADAM A. WINSELL.